United States Patent [19]
Tozer

[11] 3,738,047
[45] June 12, 1973

[54] FISH LINE CARRIER
[76] Inventor: Larry T. Tozer, 4460 Keener Road, Muskegon, Mich. 49444
[22] Filed: June 11, 1971
[21] Appl. No.: 152,091

[52] U.S. Cl. .............................. 43/43.12, 43/43.13
[51] Int. Cl. ..................... A01k 91/00, A01k 95/00
[58] Field of Search ................... 43/43.12, 43.13, 43/44.9, 17.2

[56] References Cited
UNITED STATES PATENTS

| 2,526,031 | 10/1950 | Kocarek | 43/17.2 |
| 3,137,962 | 6/1964 | Linley, Sr. | 43/43.13 |
| 2,749,649 | 6/1956 | Fitzsimmons | 43/43.12 |
| 2,609,632 | 9/1952 | Davis | 43/17.2 |
| 2,735,212 | 2/1956 | Baum | 43/43.12 |
| 2,858,637 | 11/1958 | Stark | 43/43.12 |

Primary Examiner—Hugh R. Chamblee
Assistant Examiner—Daniel J. Leach
Attorney—Glenn B. Morse

[57] ABSTRACT

A line carrier for moving a fish line down a weight-suspension line in which hydrodynamic forces generated by trolling action are utilized to provide a downward force to induce movement of the carrier downward along the weight suspension line to a predetermined depth. The fish line is releasably secured to the carrier so that a strike will pull the fish line free of the restraint of the carrier.

2 Claims, 17 Drawing Figures

INVENTOR
Larry T. Tozer

BY
ATTORNEY

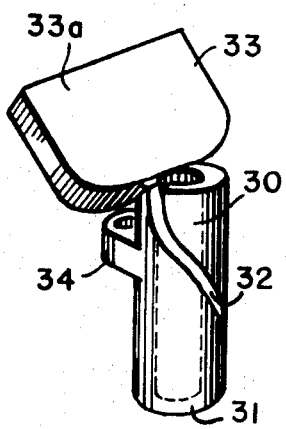
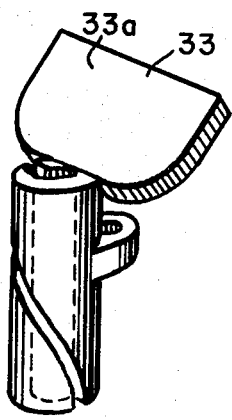
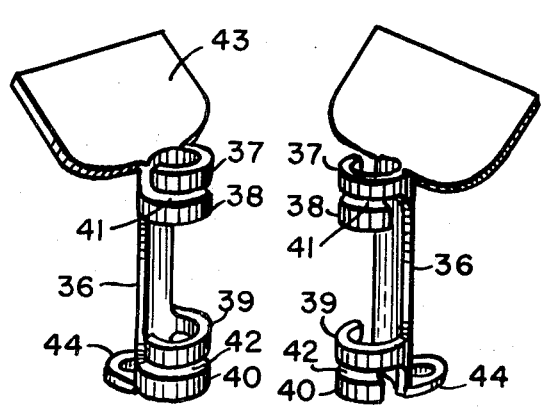
Fig. 6　　Fig. 7　　Fig. 12　　Fig. 13
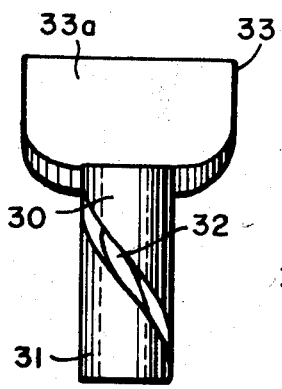
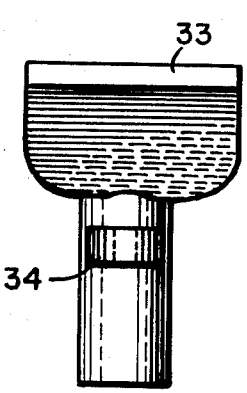
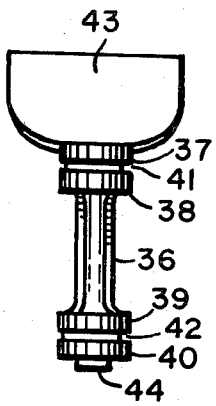
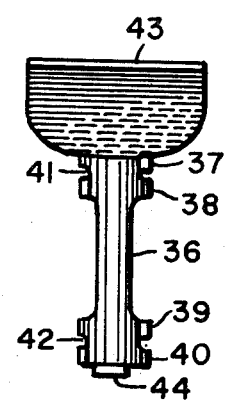
Fig. 8　　Fig. 9　　Fig. 14　　Fig. 15
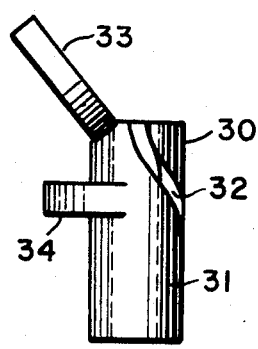
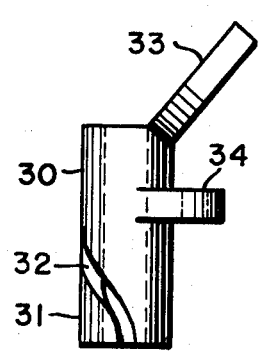
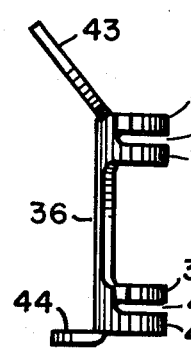
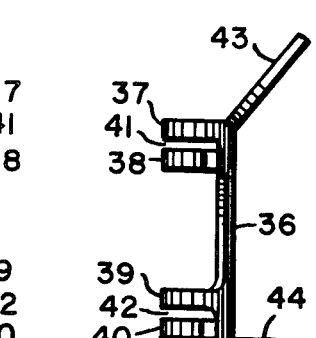
Fig. 10　　Fig. 11　　Fig. 16　　Fig. 17
INVENTOR
Larry T. Tozer
BY  *Glenn B. Snow*
ATTORNEY 3,738,047

FISH LINE CARRIER

BACKGROUND OF THE INVENTION

Deep-water trolling techniques usually involve the suspension of a relatively heavy sinker weight on a line connected to a reel, or to some other form of terminal on a boat riding at the surface. Arrangements are usually provided for releasably securing the fish line to the weight-suspension line with a degree of restraint such that a strike by a fish at the lure secured to the end of the fish line will pull the fish line free of restraint, and thus eliminate the burden of the trolling weight as the fish is reeled in. After this has been completed, the usual practice has been to reel the weight back up to the surface, re-secure the fish line to the retaining clip, and again lower the line with the lure back to the trolling depth. This operation is something of a nuisance, and often requires a careful recording of the depth at which a strike has taken place, so that the lure can be returned to the same depth.

SUMMARY OF THE INVENTION

The present invention provides a line carrier for moving the fish line down along the weight-suspension line without the necessity for returning the weight to the surface after each strike. A portion of the carrier slideably embraces the weight-suspension line, and is provided with a vane inclined to the direction of motion of the weight-suspension line through the water to a particular degree that will generate the necessary down thrust to carry the fish line along the suspension line to a point adjacent the weight. The portion of the carrier embracing the fish line engages a sufficient axial length of the line to provide the necessary stability so that the vane can be maintained at the desired angle with respect to the direction of movement through the water. It is preferable that the device embrace the fish line with a plurality of elements, each of which only partially surrounds the space occupied by the fish line, with a lateral passage between these elements through which the line can be engaged or disengaged from the carrier. When the trolling weight has been placed at its proper depth, and the boat under way through the water, the fish line is secured to a releasable clip attached to the carrier so that the lure trails behind the clip by a predetermined distance established according to experience. The hydrodynamic forces generated by the movement of the device through the water will create the necessary forces to move the carrier downward along the weight-suspension line, and carry the lure down to the operating depth. After a strike has pulled the fish line free of the releasable clip, the carrier remains in storage position adjacent the trolling weight, and another carrier is attached to the line when it is desired to return the lure to operating depth after the fish has been landed.

DESCRIPTION OF THE DRAWINGS

FIGS. 6 and 7 are perspective views from opposite quarters showing the preferred form of the carrier device.

FIG. 8 is a side elevation of the form of the invention shown in FIGS. 6 and 7.

FIG. 9 is a view of the opposite side of the device from that illustrated in FIG. 8.

FIG. 10 is an end elevation of the device shown in FIG. 8.

FIG. 11 is a view of the opposite end from that illustrated in FIG. 10.

FIGS. 12 and 13 are perspective views from opposite quarters illustrating a modified form of the invention.

FIG. 14 is a side elevation of the device shown in FIGS. 12 and 13.

FIG. 15 is a view of the opposite side of the device from that illustrated in FIG. 14.

FIG. 16 is an end elevation of the device shown in FIGS. 12 and 13.

FIG. 17 is a view of the opposite end from that illustrated in FIG. 16.

DESCRIPTION OF THE PREFERRED EMBODIMENTS

Figure 1:
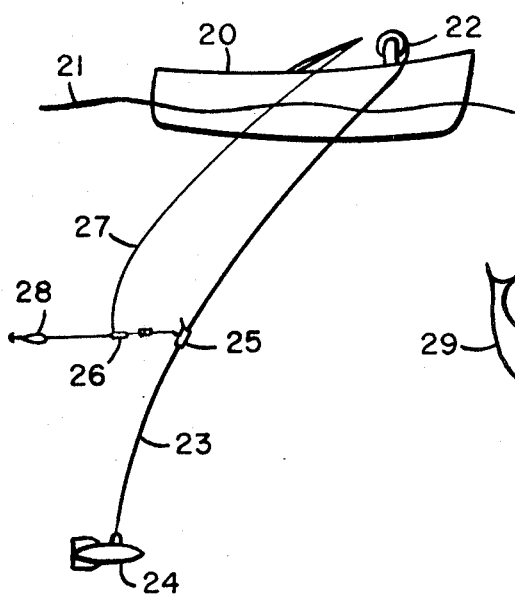
FIG. 1 is a schematic illustration showing a carrier device embodying the invention, pulling a fish line downward along a weight-suspension line.
Figure 2:
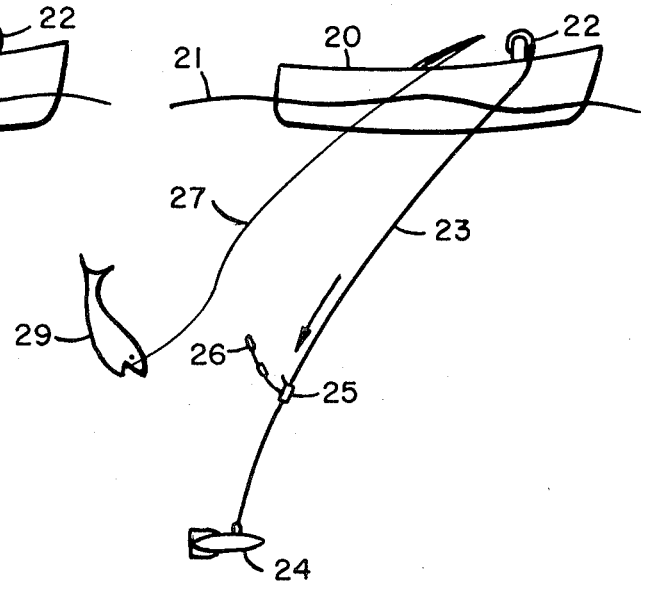
FIG. 2 is a schematic illustration showing the moment of release of the fish line from the clip on the carrier following a strike by a fish.
Figure 3:
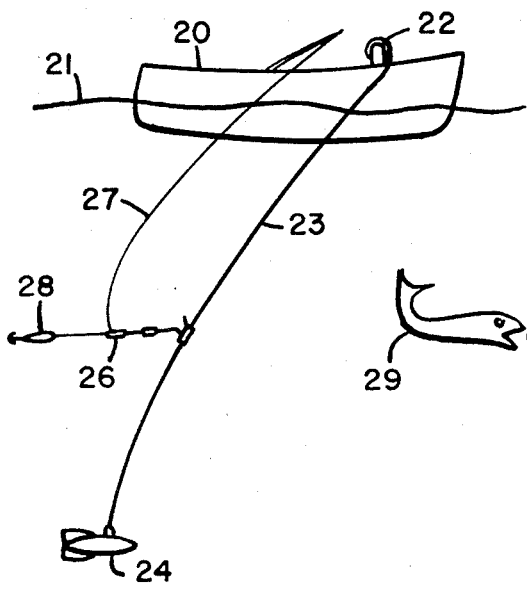
FIG. 3 shows a re-positioning of the fish line at operating depth through the use of a second carrier.

Referring to the schematic illustrations in FIGS. 1 through 4, a boat generally indicated at 20 is moving at the surface 21 of the water. A conventional reel 22 is usually mounted at the side of the boat, and carries the suspension line 23 extending to the torpedo-shaped trolling weight 24. A carrier 25 slideably engages the weight-suspension line 23, and is provided with a conventional clip 26 for releasably retaining the fish line 27 secured to the lure 28 in the usual manner. The clip 26 normally generates a gentle clamping action against the fish line which is of a predetermined intensity sufficient to withstand the force necessary to pull the fish line along through the water, but yet weak enough so that a strike by a fish 29 will pull the fish line free of the restraint so that the fish can be handled without the burden of the trolling weight. Normally, the fish line 27 will include a length of leader extending from the lure for a distance determined by the judgment of the fisherman.

Figure 5:
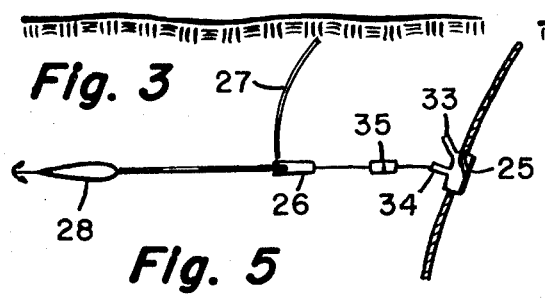
FIG. 5 is a view on an enlarged scale showing the assembly of the carrier device, and its relationship to the weight-suspension line.

After the trolling weight 24 has been lowered to a desired depth, one of the carrier devices 25 is engaged with the suspension line 23 by a fisherman sitting in the boat 20. His fish line 27 is attached to the clip 26, and the carrier device lowered into the water. From that moment, the downward passage of the carrier and the fish line is determined by the hydrodynamic forces generated by the movement of the device through the water. The placement of the lug 34 to the rear utilizes the drag of the fish line to assist in positioning the vane portion 33 with respect to the direction of motion. Referring to FIGS. 6 through 11, the portion of the device responsible for retaining it in engagement with the suspension line 23 are the portions 30 and 31, each of which partially surrounds a cylindrical surface defining a space for the passage of the line 23. The two portions 30 and 31 are separated by a helical slot 32. The two portions 30 and 31 may be considered as a tube interrupted by this slot. The function of this slot is to provide a lateral passage for the engagement and disengagement of the suspension line from the device. It should be noted that the combined effect of the portions 30 and 31 is to engage a substantial axial length of the suspension line 23 so that the vane portion 33 may be maintained at a predetermined angle with respect to the fish line, and thus generate the necessary forces on movement of the device through the water. Pressure at the front face indicated at 33a will normally induce a swiveling action of the device about the suspension line 23 so that the vane 33 is disposed downstream from the suspension line 23. A lug 34 is provided for attachment of the clip 26, preferably with the addition of a conventional swivel 35, as shown in FIG. 5.

Figure 4:
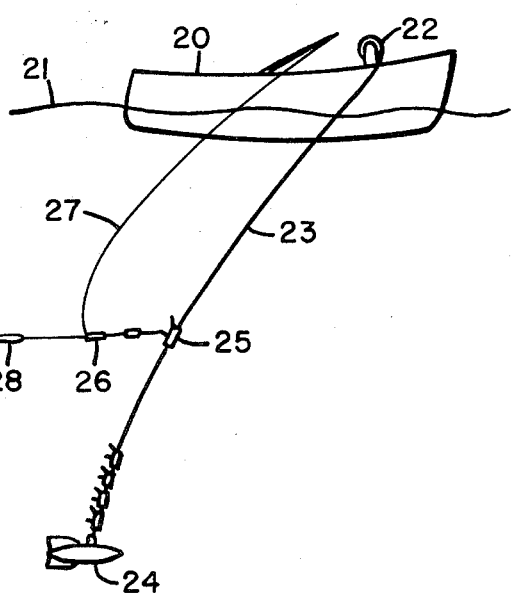
FIG. 4 is a schematic illustration showing the accumulation of a group of carriers adjacent the trolling weight after a sequence of strikes has occurred.

Referring to FIGS. 12 through 17, an essentially similar device is illustrated in which the primary point of difference is in the configuration of the portions adapted to slideably and disengageably embrace the suspension line 23. In this modification of the device, a back section 36 interconnects pairs of embracement elements 37–38 and 39–40, each of these elements surrounds a portion of the suspension line 23, and the elements are spaced by a slot as indicated at 41 and 42 to provide a lateral passage for the engagement of the device with the line 23. The two pairs of embracement portions 37–38 and 39–40 are spaced along the axis of the line 23 to provide the necessary stability for orienting the vane portion 43, as previously described. The lug 44 provides the same function as the lug 34 of the modification shown at FIGS. 6 through 11. One advantage of the modification illustrated in FIGS. 12 through 17 is the fact that it can be formed from initially flat sheet metal, after being blanked to the necessary flat configuration. It should be noted in passing that the disengageability of the device from the fish line is not vital to its function as a line carrier, as it is conceivable that a number of these devices having completely uninterrupted tubular configurations could be initially assembled to the line 23 at the line terminal, and progressively released in sequence as they are needed. This is likely to generate some degree of inconvenience, however, and the lateral disengageability is a desirable feature. After a number of the devices have accumulated adjacent the trolling weight, as indicated in FIG. 4, they can be removed all at once at some convenient time. It should also be noted that the position of the lure 28 does not necessarily have to coincide with that of the trolling weight 24, with the present invention. The trolling weight can be lowered to a depth which is certain to be below the necessary optimum point, with the fish line payed out to whatever degree is desired, with the result that the trolling depth can be altered without shifting of the weight.

I claim:

1. In combination with a boat, a trolling weight, a suspension line extending from said weight to terminal means on said boat, and a fish line having a lure secured adjacent the end thereof, a line carrier comprising:

retaining means embracing and slideably engaging said suspension line along a substantial portion of the length thereof;

vane means secured to said retaining means and disposed to generate a downward force on trolling movement of said suspension line; and clip means releasably securing said fish line to said carrier.

2. A combination as defined in claim 1 wherein said retaining means includes a plurality of elements each partially surrounding said line, said elements together surrounding said line completely and providing a lateral passage between said elements for engagement and disengagement of said line from said retaining means.

* * * * *